(12) United States Patent
Webster et al.

(10) Patent No.: US 12,160,501 B2
(45) Date of Patent: Dec. 3, 2024

(54) METHOD AND APPARATUS SUPPORTING TUNABLE ALIGNMENT FOR CIPHER/AUTHENTICATION IMPLEMENTATIONS

(71) Applicant: Marvell Asia Pte Ltd, Singapore (SG)

(72) Inventors: Tim Webster, Kanata (CA); Vladimir Milicevic, Guelph (CA); Jessica Landon, Arnprior (CA)

(73) Assignee: Marvell Asia Pte Ltd, Singapore (SG)

( * ) Notice: Subject to any disclaimer, the term of this patent is extended or adjusted under 35 U.S.C. 154(b) by 341 days.

(21) Appl. No.: 17/718,093

(22) Filed: Apr. 11, 2022

(65) Prior Publication Data

US 2023/0283452 A1 Sep. 7, 2023

Related U.S. Application Data

(60) Provisional application No. 63/317,104, filed on Mar. 7, 2022.

(51) Int. Cl.
*H04L 9/40* (2022.01)
*H04L 9/06* (2006.01)
*H04L 9/08* (2006.01)
*H04L 9/14* (2006.01)
*H04L 9/32* (2006.01)

(52) U.S. Cl.
CPC .......... *H04L 9/0631* (2013.01); *H04L 9/0825* (2013.01); *H04L 9/14* (2013.01); *H04L 9/3242* (2013.01)

(58) Field of Classification Search
None
See application file for complete search history.

(56) References Cited

U.S. PATENT DOCUMENTS

2008/0130889 A1* 6/2008 Qi ............... H04L 63/0435 380/42
2008/0240423 A1* 10/2008 Gueron ............ H04L 9/3242 380/28

(Continued)

OTHER PUBLICATIONS

"Efficient AES-GCM for CXL", 2020 Copyright by Hewlett Packard Enterprise, Nigel Edwards, Theo Koulouris, Joe Cowan 6 pages "nistspecialpublication800-38d.pdf".

(Continued)

*Primary Examiner* — William J. Goodchild

(57) ABSTRACT

A cryptographic system includes a block transfer engine and a crypto map unit. The block transfer engine is configured to receive a plurality of encrypted counter values and a plurality of packet attributes. The block transfer engine is further configured to determine a subset of encrypted counter values from the plurality of counter values that is to be used to encrypt a subset of incoming packets from a plurality of incoming packets. Encrypted counter values other than the subset of encrypted counter values are stored for later encryption use. The crypto map unit is configured to receive the plurality of incoming packets and the subset of encrypted counter values from the block transfer engine. The crypto map unit is further configured to encrypt the subset of incoming packets from the received plurality of incoming packets with the subset of encrypted counter values.

38 Claims, 11 Drawing Sheets

(56) References Cited

U.S. PATENT DOCUMENTS

| | | | | |
|---|---|---|---|---|
| 2010/0027783 A1* | 2/2010 | Yup | ............ | H04L 9/0643 |
| | | | | 380/44 |
| 2011/0255689 A1* | 10/2011 | Bolotov | ............ | H04L 9/0631 |
| | | | | 380/42 |
| 2015/0039905 A1* | 2/2015 | Griswold | ............ | G06F 21/602 |
| | | | | 713/190 |
| 2022/0006653 A1* | 1/2022 | Ghetie | ............ | H04L 9/002 |

OTHER PUBLICATIONS

IEEE Standards for Local and Metropolitan Area Networks-Media Access Control (MAC) Security, Approved Sep. 27, 2018 IEEE Std 802.1AE-2018 239 pages.

NIST National Institute of Standards and Technology, Recommendation for Block Cipher Modes of Operation: Galois/Counter Mode (GCM) and GMAC, Morris Dworkin, Nov. 2007 39 pages.

* cited by examiner

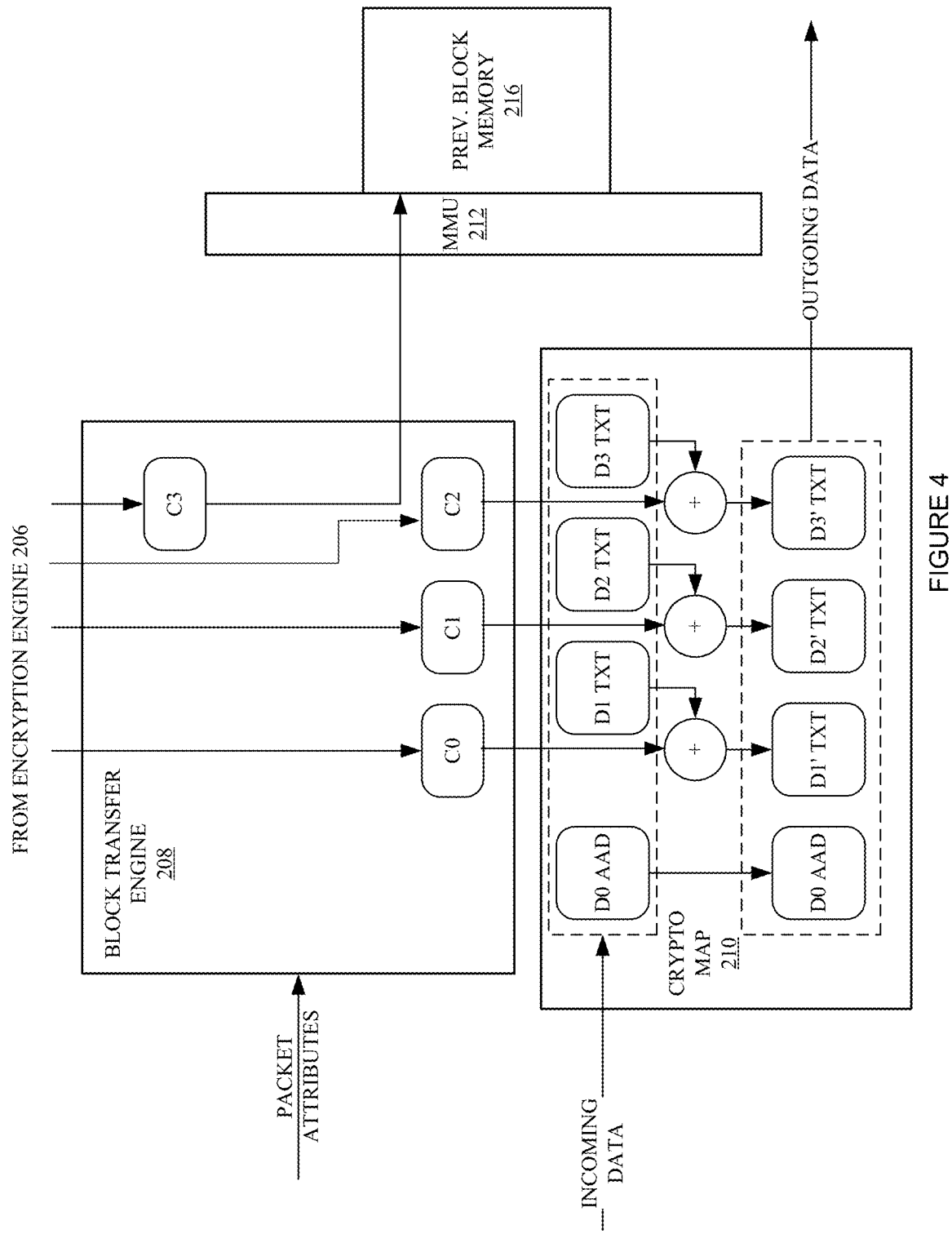

METHOD AND APPARATUS SUPPORTING TUNABLE ALIGNMENT FOR CIPHER/AUTHENTICATION IMPLEMENTATIONS

RELATED APPLICATION

This application is a nonprovisional application and claims the benefit and priority to a provisional application No. 63/317,104 that was filed on Mar. 7, 2022, which is incorporated herein by reference in its entirety.

BACKGROUND

Many applications, e.g., cryptographic operations/algorithms, transmit/receive data in a streaming fashion. Cryptographic algorithms may be implemented in hardware and/or software to encrypt and protect sensitive data. When being received at a processing unit, data being transmitted in a streaming fashion may be misaligned. For example, a 128-bit block received at a processing unit for an encryption operation via, e.g., an Advanced Encryption Standard (AES) processing, may be misaligned with a hardware data bus, resulting in additional complexity for, e.g., reformatting and realigning the data. In multi-channel implementations, where an interleaved bus structure is used, multiple data streams may be interleaved on a single bus either in the same cycle or in different cycles. The processes used in such multi-channel implementations are complex depending on a particular application, e.g., building blocks suitable for AES-Galois Counter Mode (GCM), processing the additional data presented by the blocks, reformatting and transforming the output data, etc., and may need additional memory, resulting in additional latency. Unfortunately, these particular applications may exhibit predictable behavior and patterns, which may expose the AES-GCM to attacks, e.g., tampering, snooping, neutralizing of cryptographic system, etc., to name a few. Moreover, the process of building blocks suitable for AES-GCM from an unaligned incoming data stream may be further complicated by additional processing requirements, e.g., implementation to prevent build-up in an AES-GCM transformation engine, thereby resulting in performance degradation.

Traditionally, delay in text bytes and additional authenticated data (AAD) bytes during the block building stage for AES-GCM results in an accumulation of data in excess of the width of the hardware bus. In some conventional systems, the accumulation of this data is drained on end-of-packet in order to avoid potential performance degradation and in certain instances it may be possible to insert a bubble cycle in the data pipeline to drain out the accumulation of excess data. Unfortunately, inserting a bubble cycle may not be possible for certain high performance applications, e.g., Integrity and Data Encryption (IDE) protocols used in Peripheral Component Interconnect Express (PCIe) and Compute Express Link (CXL). Here, CXL is an open standard for high-speed central processing unit (CPU)-to-device and CPU-to-memory connections, designed for high performance data center computers. CXL may be built on PCIe physical and electrical interface.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

For a more complete understanding of the present embodiments, and the advantages thereof, reference is now made, by way of example, to the following descriptions taken in conjunction with the accompanying drawings, in which:

FIG. 4 illustrates another nonlimiting example of the operation of the cryptographic system of FIG. 2 in accordance with one aspect of the embodiments.

DETAILED DESCRIPTION

Figure 1:
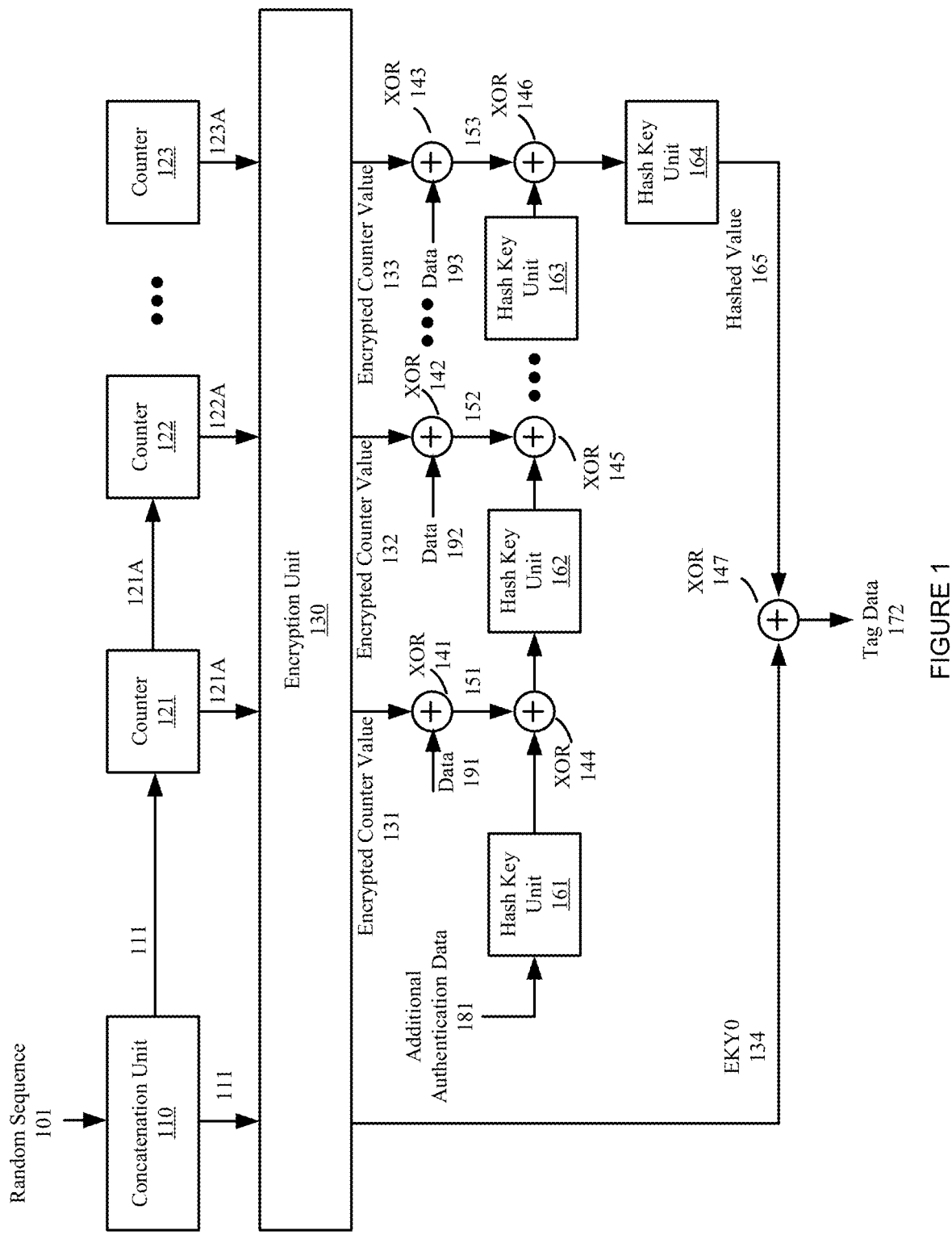
FIG. 1 shows an example of one encryption and decryption unit.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

It is appreciated that any module, component, or device disclosed herein that executes instructions may include, or otherwise have access to, a non-transitory computer/processor readable storage medium or media for storage of information, such as computer/processor readable instructions, data structures, program modules and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e., DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

The embodiments are directed to alleviating certain challenges of having unaligned incoming data blocks in a cryptographic system by restructuring a cryptographic transformation logic and/or a universal hash calculation logic to enable the system to accept unaligned incoming data blocks. In some nonlimiting examples, the restructuring eliminates the need to build blocks, which is described in greater detail below. It is appreciated that the restructuring may eliminate the need to over-provision the cryptographic engine, thereby simplifying support for data interleaving.

Throughout the application, the proposed data alignment/misalignment/unaligned approach is described with respect to the nonlimiting example of a cryptographic operation/algorithm, e.g., AES-GCM, for illustrative purposes only and should not be construed as limiting the scope of the embodiments. The same or similar approach for data alignment/misalignment/unaligned as described herein may also be implemented in other applications including but not limited to artificial intelligence (AI), machine learning (ML) application, etc., or in other types of cryptographic algorithms as understood by one skilled in the art.

FIG. 1 illustrates, a nonlimiting example of a block diagram for encryption/decryption system implementing an AES-GCM algorithm. As shown by the example of FIG. 1, the encryption process involves generating a sequence of blocks. For example, a random number or sequence 101 may be generated. In one nonlimiting example, the random sequence 101 may be 96 bits in length. In one nonlimiting example, in a "counter" mode of operation, called AES-CTR, a data vector (which may be a random number as well), e.g., 32-bits, is used along with the random sequence 101 to create a unique 128-bit counter value 111. In one nonlimiting example, the concatenation unit 110 may concatenate the data vector to the random sequence 101, e.g., the data vector of 32 bits may be concatenated as the least significant bits to the random sequence 101. The generated sequence 111 (hereinafter referred to as counter value) is incremented for each received packet. For example, the counter value 111 may be incremented by counter 121 to generate another counter value 121A for the first packet. Similarly, the counter value 121A is incremented by counter 122 to generate yet another counter value 122A for the second packet and the process continues until the last counter value 123A is generated by the counter 123 in a similar fashion. It is appreciated that each of the counter values 111, 121A, 122A, . . . , 123A is unique and may be encrypted by the encryption unit 130 to generate encrypted counter values 134, 131, 132, . . . , and 133 respectively. It is appreciated that one encryption unit 130 is shown for illustrative purposes and should not be construed as limiting the scope of the embodiments. For example, each counter value 111, 121A, 122A, . . . , 123A may be encrypted by its own individual encryption unit where the encryption key is the same for each counter value 111, 121A, 122A, . . . , and 123A.

According to some embodiments, the first packet of data, e.g., plain text (PT), may be data 191 that is XORed 141 with the encrypted counter value 131 that generates a cipher text (CT) 151. Similarly, other data packets are also XORed with their respective encrypted counter value to generate their respective CTs. For example, data 192 is XORed 142 with the encrypted counter value 132 to generate CT 152 and finally the last packet, data 193 is XORed 143 with the encrypted counter value 133 to generate CT 153. In other words, during the encryption process, each packet, i.e., PT block, that in this nonlimiting example is 128 bit long is XORed with an encrypted counter value to generate their respective CT block. In some embodiments, for encryption, each counter value is encrypted with the encryption key and then XORed with an incoming PT block, thereby generating the CT block.

Once the CT block is generated, as described above, an authentication tag may be calculated over the CT block (i.e., after encryption and before decryption). When decrypting, the calculated authentication tag (that is generated after encryption but before decryption) may be compared against an authentication tag received in association with the CT block. The result of the comparison is either a pass or a fail, e.g., a match between the two indicates a passed authentication and a mismatch indicates a failed authentication.

It is appreciated that AES-GCM algorithm also uses two additional values, a hash key and a value often referred to as "EKY0" value to generate a tag data 172. The ultimate hash value 165 is generated from a series of sub-hash values. For example, the first sub-hash value is generated for a first packet (i.e. first CT) and is fed into a second CT to generate a second sub-hash value for the second packet and so forth until the ultimate hash value is generated. For example, AAD 181 may be used as an input by a hash key unit 161 to generate a hashed value for CT 151, using a hash key. The hash value from the hash key unit 161 is XORed 144 with CT 151 to generate a first hashed value (i.e., corresponding to the first packet or data 191). The first hashed value is input to hash key unit 162 associated with the second packet (i.e., data 192) that generates another hashed value based on the same hash key as hash key unit 161. The hashed value of hash key unit 162 is XORed 145 with CT 152 to generate a second hashed value and the process continues until the last packet is received and processed by the hash key unit 163 and XORed 146 in a similar fashion. The XOR 146 outputs a hash value that is hashed using the hash key unit 164 that generates the ultimate hashed value 165. As illustrated, the hashed value 165 is not generated until all CTs are generated. It is appreciated that in some embodiments, the hash key for each hash key unit is the same for illustrative purposes and should not be construed as limiting the scope of the embodiments. For example, the hash key for two hash key units may be different in some applications.

It is appreciated that the hash key may be used, in a so-called GHASH kernel, to calculate an authentication tag value or a message authentication code (MAC) value. The hash key may be calculated by encrypting a 128-bit block of all zeros, as one nonlimiting example. The hash key may be calculated in advance using one of the main Text block AES lanes when idle, or by instantiating a dedicated AES pipe for the purpose of advance calculation of the hash key. The hash key may be provided by software when the main encryption key and the random sequence 101 are provided.

In some embodiments, AES-GCM utilizes universal hashing over a binary field (e.g., a Galois field) to provide functionalities that support encryption and authenticated decryption using multi-bit encryption keys, e.g., 128-bit encryption keys, 192-bit encryption keys, 256-bit encryption keys, etc. For a non-limiting example, an AES-GCM implementation for encryption may receive a text between 0 and $2^{39}$-256 bits in length as well as an AAD that may be between 0 and $2^{64}$ bits in length. The received text and the AAD are grouped into sets of complete 128-bit input blocks (denoted herein as blocks) along with an initialization vector (i.e., data vector as described above) between 1 and $2^{64}$ bits in length to generate an output with the same length as that of the AAD and the text plus an authentication tag between 0 and 128 bits in length.

The EKY0 134 value is the result of encrypting the counter value 111 using the encryption unit 130 with the same encryption key, as used above for other counter values 121A, 122A, . . . , 123A. In one nonlimiting example, the counter value 111 is used which is the random sequence 101 concatenated with a data vector. It is appreciated that the use of the counter value 111 to generate the EKY0 134 value is for illustrative purposes only and should not be construed as limiting the scope of the embodiments.

The EKY0 134 value may be XORed 147 with the hashed value 165 at the end of the packet to generate the tag data 172. Since packets typically start with an AAD block, one approach involves using unused AES pipe, available at the start of packet (SOP), to calculate the EKY0 value. The EKY0 value may then be stored until needed at the end of packet (EOP). In a general application, where there are no unused AES pipes on SOP, a dedicated AES pipe can be used to calculate the EKY0 value.

It is appreciated that the input blocks may be divided into AAD blocks and Text blocks, e.g., PT or CT. It is appreciated that CT is the PT that is encrypted, as described above. The AAD, the PT, and/or the CT blocks may be authenticated.

For decryption, an AES-GCM implementation receives a set of complete 128-bit input blocks (i.e., CTs) along with the random sequence 101 and generates 128-bit output blocks plus a tag as well as a pass/fail indication. In other words, the same starting value (i.e., data vector) for a counter block are used to create the same unique counter values, which are then encrypted with the same encryption key. The encrypted counter values, when XORed with an incoming CT block, generate the original PT block. Note that, in both encryption and decryption, the process of generating the sequence of encrypted counter blocks is identical. In the decryption process, each CT block is XORed with the same encrypted counter block, from the same sequence of encrypted counter blocks, that was used for encryption.

The AES-GCM algorithm may be deployed in software and/or hardware. In one embodiment, the AES-GCM implementation may create 128-bit blocks, by grouping AAD and CT/PT, from an incoming data stream, and the created 128-bit blocks may be processed using a hardware-based implementation of the AES-GCM algorithm, e.g., using a processing element such as a CPU, application specific integrated circuit (ASIC), field programmable gate array (FPGA), etc., to generate an output data stream, which is encrypted.

It is appreciated that the number of bits, the size of the block, a particular algorithm such as AES-GCM, etc., are provided for illustrative purposes and should not be construed as limiting the embodiments. Moreover, throughout this disclosure, "unaligned blocks" or "misaligned block" refer to incoming data that is not aligned to the natural 128-bit block boundary typically required by AES-GCM implementations. Incoming data may contain complete blocks (N×128-bits) of data or partial blocks (<128-bits) of data, with potentially tunable and variable alignment.

The Institute of Electrical and Electronics Engineers (IEEE) has published a standard with a reference number 802.1AE. IEEE 802.1AE, known as "MACsec," which is a network security standard that operates at the medium access control layer and defines connectionless data confidentiality and integrity for media access independent protocols. MACsec is standardized by the IEEE 802.1 working group.

In some embodiments, Internet Protocol Security (IPsec), which is a secure network protocol suite, may be used to authenticate and encrypt packets of data to provide secure encrypted communication between two computers over an Internet Protocol network. Some applications may use secure data communication, e.g., PCIe, CXL, MACsec, IPsec, etc., where packets or requests always begin with a header. The header may be considered as the AAD. By considering the header to be AAD, a free AES pipe on SOP is guaranteed. As discussed above, the free AES pipe can be used to calculate the EKY0 134 value. The free AES pipe can also be used to perform other functions. In some embodiments, the EKY0 134 value is calculated in advance and may be stored until required on EOP. Unfortunately, storing the EKY0 134 in advance unnecessarily consumes storage and power.

Since incoming Text blocks and calculated encrypted counter blocks are to be bit-aligned for proper operation, the incoming Text blocks are typically built from an incoming, unaligned packet stream. Depending on the width of the bus and the alignment of the Text block with the 128-bit encrypted counter block, it may not be possible to create a complete block to send to the AES-GCM core in a current cycle. In response to this situation, conventional approaches involving storing a partial block. The partial block may, subsequently, be merged with data from at least one subsequent cycle. Such merging may result in inefficient use of the available AES pipelines and an overprovisioning of the number of AES pipelines that are to be instantiated to prevent delaying of the blocks on EOP. It is appreciated that pushing data to a next cycle involves extra processing bandwidth at the end of the packet to avoid buildup or performance issues.

Additionally, several protocols, including PCIe IDE and CXL IDE, support amortization of an AES-GCM authentication tag value or an AES-GCM MAC value across multiple packets. Such amortization may reduce overhead incurred in supporting authentication without adversely impacting the cryptographic properties of the hash. The group of packets over which a single MAC value may be calculated may be referred to as an Aggregated Unit (AU) or an Epoch. A MAC value may be calculated over multiple packets using partial block of data from the next packet when the last block of a given packet is not the end of the AU. Building blocks across packets, however, may result in unacceptable delay variation, as a given packet cannot be sent until the subsequent packet arrives to complete the block.

As discussed above, to address unaligned block of data for example in AES-GCM, a bubble cycle(s) were inserted in conventional cryptographic systems. However, bubble cycle insertion may not always be possible, e.g., on the receive side of the send/receive pair, as discussed above. Additionally, it is preferable for the data to be processed at a maximum incoming line rate, at the receive side. A kernel, e.g., GHASH kernel, may generate a MAC. However, if an end of packet cycle contains both AAD bytes and Text bytes and also contains data from a previous cycle, then the kernel processing extends beyond its typical processing capabilities. Complexity increases to address the kernel processing capabilities extending beyond its typical processing, especially when additional AES lanes are needed to process Text blocks and/or when additional kernel lanes are needed to process both Text blocks and AAD. In addition to the increase in complexity, the scheduling may adversely be impacted, e.g., when accumulation is missed. Furthermore, building complete 128-bit blocks of AAD and Text data, and processing only the AAD and Text after the complete blocks are built, as it is done in conventional AES-GCM, exposes the cryptographic system to potential attack vector because of latency created between the time the complete blocks are built and until they are stored. Sophisticated cyber attackers may identify the completion of a block by monitoring the transfer of a complete block of AAD or Text and as such may exploit the cryptographic system. In some proposed embodiments, the data is processed for that cycle and not necessarily in blocks of 128 bits, which results in a higher security against potential attackers due to its unpredictability.

In some proposed embodiments, as discussed in subsequent figures, an additional counter block is calculated in a given cycle, instead of the EKY0 134 value, such that the counter block generation process is one block ahead of the incoming text blocks. In some embodiments, calculating the additional counter block may be shown to effectively free up one AES pipe on EOP to calculate the EKY0 134 value, when needed. Calculating the EKY0 134 value on EOP may save memory space that would, otherwise, be required to store the EKY0 134 value.

In some embodiments, the proposed AES-GCM processor can accept a partial block for the purposes of encryption or decryption. In such cases, the AES-GCM processor may calculate an intermediate hash result upon receipt of the next packet and completion of the block. Implementation of the AES-GCM algorithm in a way that is tolerant of partial blocks may involve provision of additional storage for the partial block. Implementation of the AES-GCM algorithm in a way that is tolerant of the partial blocks may further involve special logic within the AES-GCM core to implement the AES-GCM algorithm correctly across the group of packets that form the AU. In some embodiments, the partial-block tolerant implementation of the AES-GCM algorithm involves processing an incoming block with any alignment, without regard to whether the incoming block is a partial block or a complete block. The partial-block tolerant AES-GCM algorithm, implemented according to aspects of the present application, may reduce block building and assembly issues as well as reducing issues related to the handling of AUs.

The proposed embodiments restructure a cryptographic transformation logic and/or a universal hash calculation logic, thereby enabling the system to accept unaligned incoming data blocks. In some nonlimiting examples, the restructuring eliminates the need to build blocks and/or the need to over-provision the cryptographic engine, thereby simplifying support for data interleaving. The embodiments, as described herein, are applicable to many standards including new PCIe and CXL.io standards that require integrated encryption (defined by the known IDE protocol), in which multiple interleaved channels may be present in a single cycle. It is appreciated that the embodiments may also simplify support for aggregation in PCIe and CXL protocols.

Figure 2:
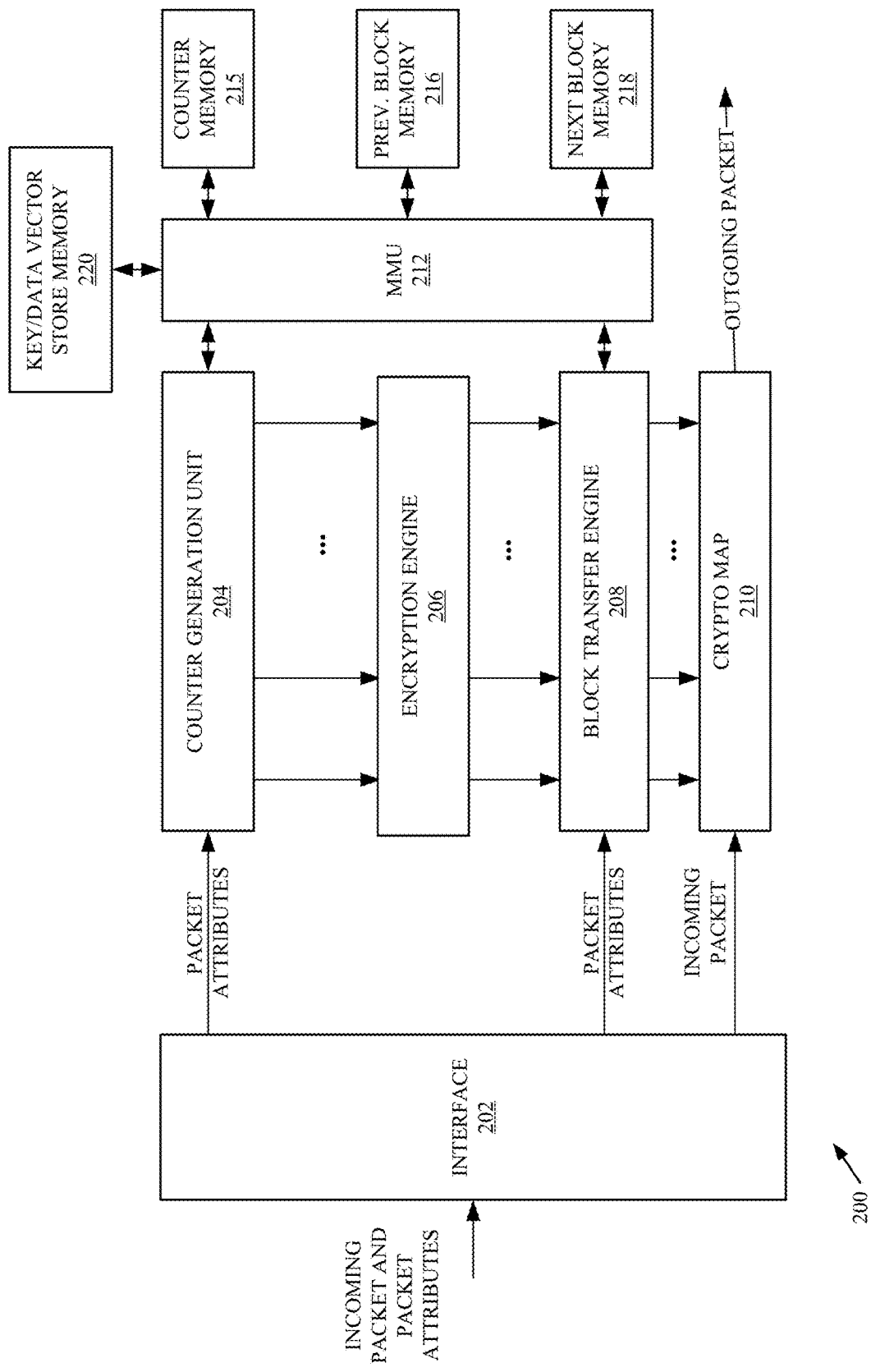
FIG. 2 shows an example of a cryptographic system in accordance with one aspect of the embodiments.

Referring now to FIG. 2, a cryptographic system including transformation logic in accordance with some embodiments is shown. A cryptographic system 200 includes an interface component 202 for receiving incoming packets (e.g., PTs) and their respective attributes. The cryptographic system 200 also includes a counter generation unit 204, an encryption engine 206, a block transfer engine 208, a crypto map 210 unit, and a plurality of memory components, e.g., counter memory 215, previous block memory 216, a next block memory 218, key/data vector store memory 220, etc., that may be managed by a memory management unit (MMU) 212. It is appreciated that the memory components are illustrated separate from one another for illustrative purposes, however, in some embodiments, one memory component that may be segmented may be used. As such, illustration of the memory components as separate component should not be construed as limiting the scope of the embodiments.

The counter generation unit 204 is substantially similar to the concatenation unit 110 and the counters 121-123 of FIG. 1. The counter generation unit 204 receives a data vector from the key/data vector store memory 220 and the last counter value from the counter memory 215 to generate the next counter value. The counter value is updated and the new value is stored in counter memory 215 for generating the next counter value. The counter generation unit 204 also receives the packet attributes such that the correct number of counter values can be generated. The counter values are transmitted to the encryption engine 206 for encryption. The encryption engine 206 is an encryption engine similar to encryption unit 130 of FIG. 1, where the counter values are encrypted with an encryption key. It is appreciated that only one encryption engine is shown for illustrative purposes but it should not be construed as limiting the scope of the embodiments. For example, the encryption engine 206 may be a plurality of encryption engines where each one encrypts one counter value. It is appreciated that in one nonlimiting example the encryption engine 206 may be an AES. In some embodiments, the same encryption key is used for illustrative purposes but should not be construed as limiting the scope of the embodiments. For example, different keys may be used for different channels as identified by the packet attributes.

In some embodiments, the encrypted counter values are transmitted to the block transfer engine 208. The block transfer engine 208 may also receive the packet attributes via the interface 202. The block transfer engine 208 stores the received encrypted counter values in the next block memory 218 via the MMU 212. In the next cycle, the block transfer engine 208 again receives the next set of encrypted counter values from the encryption engine 206 and stores it in the next block memory 218 and within the same cycle reads the previously stored encrypted counter values from the next block memory 218. It is appreciated that the block transfer engine 208 storing the encrypted counter values is described for illustrative purposes and should not be construed as limiting the scope of the embodiments. For example, the encryption engine 206 may instead store the encrypted counter values in the next block memory 218 that is subsequently accessed by the block transfer engine 208 to determine which encrypted counter values are to be used by the crypto map 210 unit. The read encrypted counter values by the block transfer engine 208 along with the packet attributes are used to determine whether the read encrypted counter values are to be used for encrypting PTs. For example, the encrypted counter values are not used for encrypting AAD. As such, the block transfer engine 208 stores a given encrypted counter value in the previous block memory 216 when the block transfer engine 208 determines that the given particular encrypted counter value corresponds to an AAD packet as opposed to a PT.

The remainder of the read encrypted counter values are transmitted to the crypto map 210 unit in order to encrypt the PTs, e.g., XORing the incoming packets with the encrypted counter values, similar to FIG. 1. It is appreciated that the packet corresponding to AAD is not encrypted by the crypto map 210 unit whereas other packets corresponding to PTs are encrypted similar to that as described in FIG. 1. It is appreciated that the stored encrypted counter value that is now stored in the previous block memory 216 may be used for encryption in later cycles.

It is appreciated that the block transfer engine 208 and the crypto map 210 unit are shown as separate units for illustrative purposes only. However, the block transfer engine 208 engine and the crypto map 210 unit may be integrated as a single unit. As such, the operation of the block transfer engine 208 and the crypto map 210 unit as described as separate units are for illustrative purposes and should not be construed as limiting the scope of the embodiments.

As described above, the unused bits in an encrypted counter block for a current cycle may be stored in the previous block memory 216 for use in the next cycle. The counter generation unit 204 generates counter values, as required, based on the nature of interleaved packet data presented in a current cycle and based on a location of the packet data in the AU. Access to the combination of the previous block memory 216 and the next block memory 218 may be shown to enable encryption and decryption of incoming Text blocks with any alignment. The encryption and decryption may be carried out by a combination of the encryption engine 206, the block transfer engine 208, and the crypto map 210 unit, as described above.

The counter generation unit 204 and the block transfer engine 208 are arranged for exchanging communication with the MMU 212. The MMU 212 is arranged for bidirectional communication with the key/data vector store memory 220, a counter (CTR) memory 215, a previous block memory 216, and the next block memory 218.

Instead of realigning an incoming Text block to complete 128-bit blocks for use in the AES-GCM algorithm, the embodiments as described align a generated encrypted counter values (block bit stream) to a natural alignment of an incoming block, i.e., PT. In this way, both partial blocks and complete blocks can be easily encrypted and decrypted and any bypass data can be easily passed through without special handling and without bypass pipelines.

In some embodiments, the transformation architecture 200 implements a partial-block tolerant implementation of the AES-GCM algorithm, wherein encrypted counter blocks continue to be generated in complete 128-bit aligned blocks. The encrypted counter blocks may only be partially consumed based on a "starting crypto block offset" associated with an incoming Text block. As such, the embodiments support encryption at any byte offset in an incoming data stream. The term "byte offset" is used here, even though any offset may be tolerated. The offset may be measured in bits, bytes, words, dual-words, quad-words, etc. In a first example, a received packet may be 1024B long and the internal bus is 64B wide. It may be expected that the received packet would be handled 64B at a time, over 16 cycles, so not all at the same time. It is appreciated that the first byte to be encrypted may start at any byte offset within the received packet, in general. Accordingly, to encrypt starting at byte 60B in the 1024B packet, for the first 64B transfer, the first 59B may be ignored (not encrypted) such that encrypting starts at byte 60B in the first cycle. Routine encryption may continue every cycle afterwards. It is appreciated that in a scenario where it is necessary to build blocks, the first 64-60B (4B) may be stored in a memory and combined with 12B data from the next cycle to create a 16B (128-bit) block for the crypto engine. Accordingly, a 128-bit counter block is obtained in the first cycle and only 4 byte (B) are encrypted using the encrypted counter blocks needed (first 4B). It follows that the first 64B is sent out with only the last 4B encrypted. The 16-4=12B that remains unused from the first counter block may be stored in a memory to use at a later time. In a conventional cryptographic system, it is necessary to wait until a full 128-bits of data has been received so that a complete 128-bit encrypted counter block is used for encryption.

It is appreciated that the embodiments as described with respect to FIG. 2 are applicable to certain standards including but not limited to PCIe and CXL applications. PCIe and CXL applications typically use DW alignment. DW alignment limits multiplexing options for aligning the encrypted values with incoming Text Blocks at the XOR gates, which is addressed by the proposed embodiments of FIG. 2.

It is appreciated that the storing of the encrypted counter values in the next block memory 218 is for illustrated purposes only and should not be construed as limiting the scope of the embodiments. For example, the encrypted counter values may be evaluated by the block transfer engine 208 in light of the packet attributes to determine individual encrypted values that are not be used in the current encryption cycle. The individual encrypted values that are not to be used (e.g., partial encrypted value such as C3 in FIGS. 3A-3C described later) in the current cycle are stored in the previous block memory 216 for later use and the ones that are to be used in the current cycle are transmitted to the crypto map 210 unit for use. As such, a need to store the encrypted counter values that are to be used right away is eliminated. In other words, the destination, e.g., storing in previous block memory 216, storing it in the next block memory 218, transmitting it to the crypto map 210 unit, etc., of a given encrypted counter value may depend on the packet attributes received in a given cycle.

Figure 3A:
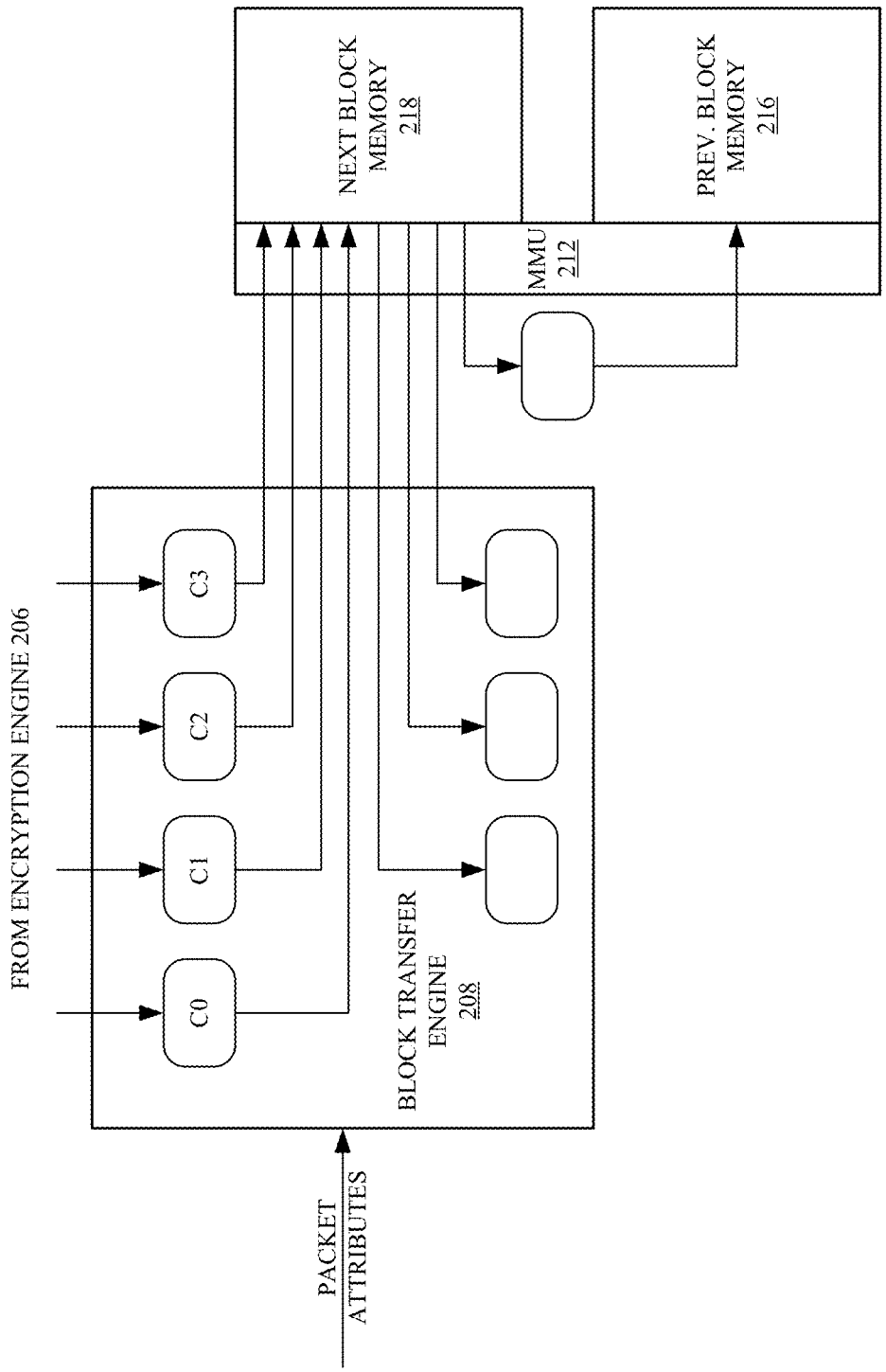
FIGS. 3A-3C show nonlimiting examples of the operation of the cryptographic system of FIG. 2 in accordance with one aspect of the embodiments.
Figure 3B:
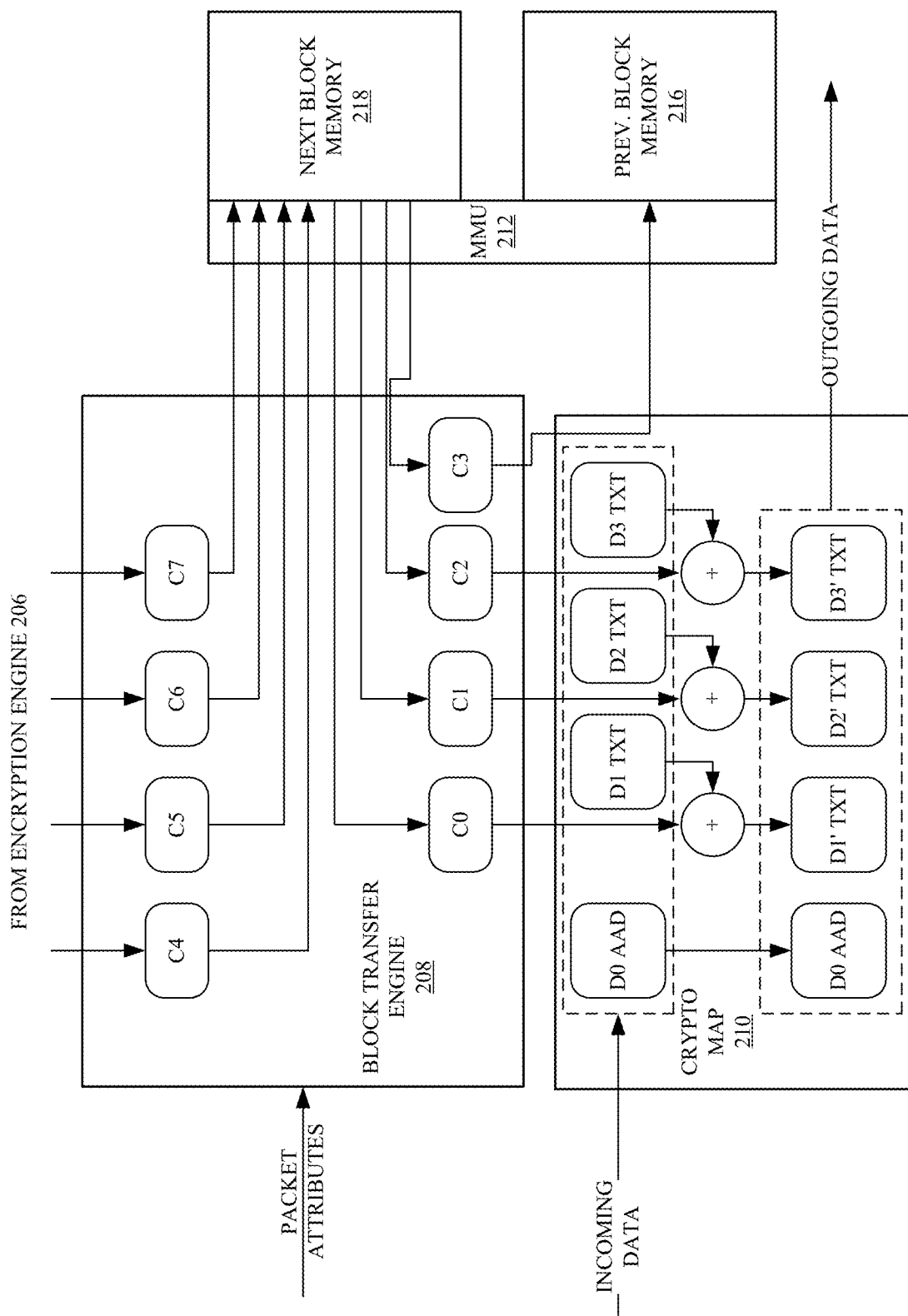
Figure 3C:
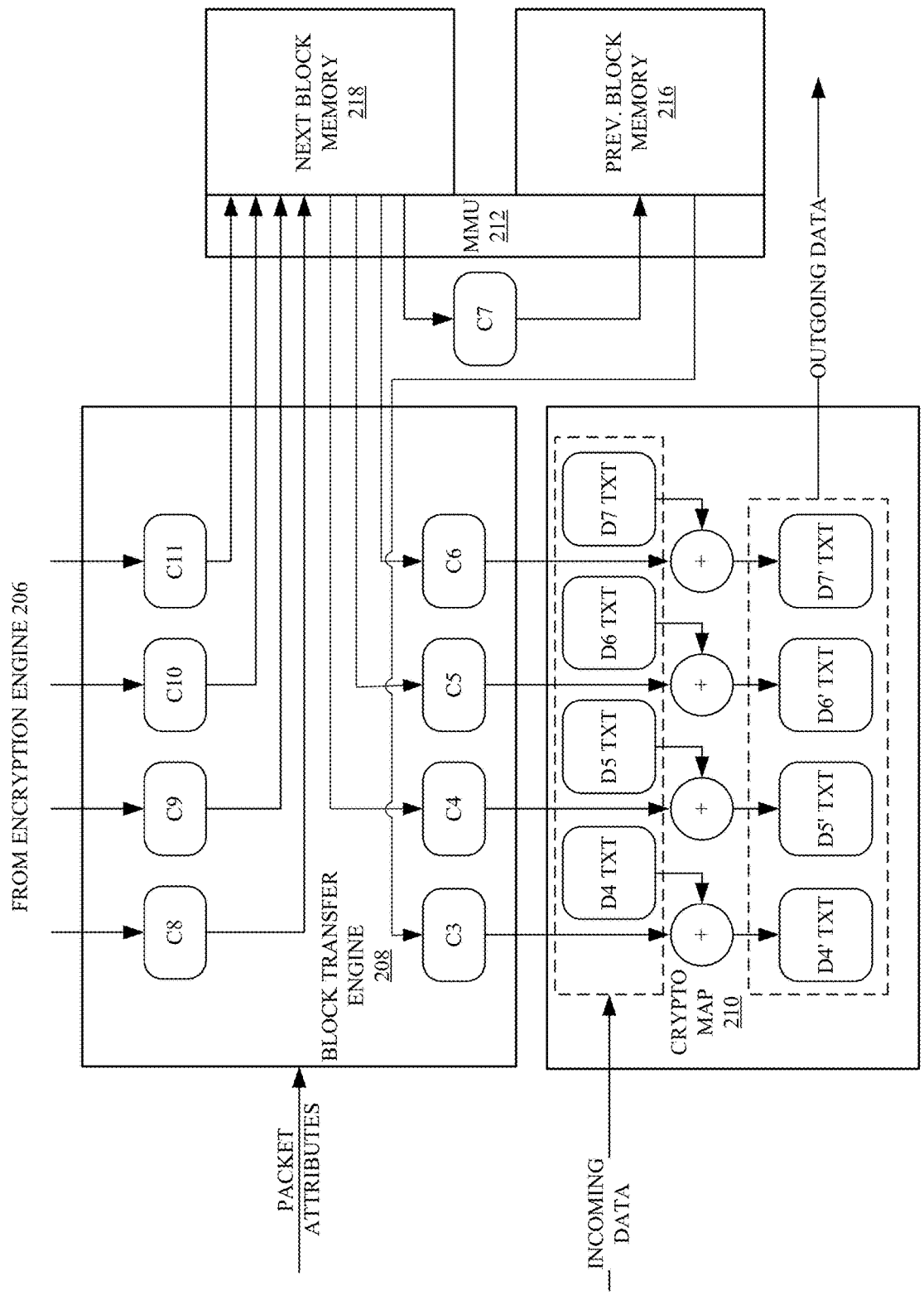

In some embodiments, the cryptographic operation as discussed in the embodiment of FIG. 2, is clarified further in light of the examples of FIGS. 3A-3C and 4. FIGS. 3A-3C illustrate a nonlimiting example of a cryptographic system operating in different cycles. For illustrative purposes, it is assumed that the data is 32-bit aligned data used in PCIe and in CXL. In one nonlimiting example and 8-bit aligned data may be used. If a data bus is 128 bits wide, then each 32-bit portion of data may be referred to as a "DW." Consequently, a 128-bit bus carries four DWs. In contrast, if the DWs were 8-bits, the 128-bit bus would carry 16 DWs.

In the example of FIG. 3A, a first cycle, e.g., initial cycle as an example, of the cryptographic system is shown. In the first cycle, the block transfer engine 208 may receive the encrypted counter values C0-C4 from the encryption engine 206, where each encrypted counter value is a DW. The encrypted counter values C0-C4 may be stored by the block transfer engine 208 in the next block memory 218 via the MMU 212. As illustrated, no values are being read by the block transfer engine 208 since this is the first cycle.

Referring now to the example of FIG. 3B, a subsequent cycle of the cryptographic system is illustrated. In this cycle, the next set of encrypted counter values, i.e., C4-C7 are received from the encryption engine 206 and are stored in the next block memory 218. In the same cycle, the block transfer engine 208 reads the previously stored encrypted counter values, i.e., C0-C3 from the next block memory 218. The block transfer engine 208 determines whether C0-C3 are to be used to encrypt the received data (i.e., PT) based on the received packet attributes. In this nonlimiting example and for illustration purposes only, the block transfer engine 208 may use the packet attributes to determine that the first packet receive is AAD and that it does not need to be encrypted whereas packets D1-D3 are PTs that need to be encrypted. In other words, only the PTs are encrypted and AAD is not encrypted. As such, the block transfer engine 208 transmits the encrypted counter values C0-C2 to the crypto map 210 unit and stores the encrypted counter value C3 in the previous block memory 216 via the MMU 212 for later use. It is appreciated that during the same cycle, the crypto map 210 unit receives the incoming packets, i.e., D0-D3 where D0 is AAD and where D1-D3 are PT. It is appreciated that in this nonlimiting example each incoming packet is a DW. Accordingly, the crypto map 210 unit encrypts D1-D3 with C0-C2 respectively to generate CTs that are D1'-D3' while D0 that is AAD remains unencrypted. The crypto map 210 unit outputs D0, D1', D2', and D3'. It is appreciated that a similar process occurs to decrypt the encrypted data. It is appreciated that the previous block memory 216 is used to store encrypted counter value DWs that are not to be used in the current cycle.

Referring now to the example of FIG. 3C, the next subsequent cycle to that of FIG. 3B is shown for illustrative purposes. In this nonlimiting example, the block transfer engine 208 receives the next set of encrypted counter values, e.g., C8-C11, from the encryption engine 206. In this cycle, the encrypted counter values C8-C11 are stored in the next block memory 218 for later use. In the same cycle, the block transfer engine 208 reads the encrypted counter value C3 from the previous block memory 216 along with reading the encrypted counter values C4-C6 from the next block memory 218. The encrypted counter value C7 is moved from the next block memory 218 and is stored in the previous block memory 216. The block transfer engine 208 determines whether the encrypted counter values C3-C6 are to be used for encrypting the received incoming data, similar to the process in FIG. 3B. In this nonlimiting example, the block transfer engine 208, based on the packet attributes, has determines that each of C3-C6 is to be used in encrypting the received incoming data. As such, the encrypted counter values C3-C6 are transmitted to the crypto map 210 unit and as such each received DW, i.e., D4-D7, is encrypted with C3-C6 respectively to generate the encrypted data D4', D5', D6', and D7' respectively. The generated encrypted data may subsequently be transmitted as an outgoing data. It is appreciated that if the block transfer engine 208 had determined that for example C5 is not to be used in the current cycle then C5 would have been stored in the previous block memory 216 along with C7.

Accordingly, in some embodiments, use of the previous block memory 216 and the next block memory 218 enables the counter generation unit 204 to be ahead of transformation logic that is carried out by a combination of the block transfer engine 208 and the crypto map 210 unit. As illustrated, the block transfer engine 208 receives various encrypted counter values and passes, to the crypto map 210 unit, the encrypted counter values bit aligned appropriately with the incoming packet. The crypto map 210 unit XORs the encrypted counter bits correctly aligned with the incoming data and, thereby, generates transformed output data.

The proposed embodiments achieves ultra-low latency (0 cycles) in certain protocols such as CXL.cache protocol and the CXL.mem protocol by computing encrypted counter values for an incoming packet stream (an incoming text sequence) in advance. The encrypted counter values computed in advance may be stored in an encrypted counter block memory (not shown) and read once the actual Text blocks are received. By computing the encrypted counter values in advance, the delay through the encryption engine 206 is masked and transformation latency is determined by the memory read cycle timing. Providing the packet attributes in advance of the data or reducing support to a single channel can reduce the transformation delay by a duration equal to the logic delay of a single XOR gate, as a nonlimiting example.

It is appreciated that because the number of TXT blocks with an AU are unknown in advance, some precomputed encrypted counter values may need to be deleted with the next starting counter value for the next AU made available to, thereby, minimize performance impact. Dropping unneeded encrypted counter values at the end of the current AU may be carried out in so-called 0 time to, thereby reducing performance impact.

Referring now to the example of FIG. 4, another cryptographic system according to some embodiments is shown. In this embodiment, the encrypted counter values, i.e., C0-C3 are not stored in the next block memory 218. Instead, the block transfer engine 208 determines and identifies the encrypted counter values to be used for the incoming packets, e.g., C0-C2. The encrypted counter value C3 that is not to be used in this cycle is stored in the previous block memory 216. The encrypted counter values C0-C2 that are to be used are transmitted to the crypto map 210 unit such that the incoming packets D1-D3 are encrypted with the encrypted values C0-C2 respectively. C3 that is stored may be used in subsequent cycles similar to the process as described in FIGS. 3A-3C.

It is appreciated that storing the C3 encrypted value in the previous block memory 216 is for illustrative purposes and should not be construed as limiting the scope of the embodiments. For example, in one nonlimiting embodiment, C3 is not used and discarded all together and in the next cycle, new encrypted values are generated and used by the bock transfer engine 208 and the crypto map 210 unit without a need to store the encrypted values in memory regardless of whether they are used or not.

As discussed above, in some embodiments, a GHASH Kernel is responsible for calculating a final MAC value for a channel over a set of packets within an AU. The MAC value is calculated using the 128-bit CT blocks, 128-bit AAD blocks, a 128-bit EKY0 block, the bit lengths of the CT blocks and the AAD blocks and the 128-bit hash key described earlier. The GHASH process involves addition, multiplication and polynomial reduction in $GF(2^{128})$ using Galois Finite Field Arithmetic. Implementations of GHASH architecture typically generate fixed-sized 128-bit blocks of AAD and CT. Accordingly, such implementations of GHASH architecture need to build blocks, as described above in addition to the need to overprovision the number of GHASH lanes required to handle end-of-AU processing. The embodiments, as described in FIG. 5 below, enables both partial and complete blocks to be processed without the need to build complete 128-bit blocks. The authentication architecture 500 utilizes a single 128-bit intermediate rolling hash result for each possible packet that may be present in any given cycle.

As shown in FIG. 1, calculating the MAC value is a successive series of operations on the AAD blocks and on the Text blocks in order involving a Galois Multiplication by the hash key and a sum (XOR). This chained sequence of operations can be subdivided and performed in parallel and out-of-order, provided that the rules of Finite Arithmetic are followed, to rearrange the equations without modifying the final calculated result. As such, the AAD block intermediate hash result and the Text block intermediate hash result can be calculated independently and added later by multiplying the final AAD block intermediate hash result by the hash key raised to the power of the number of Text blocks.

Figure 5A:
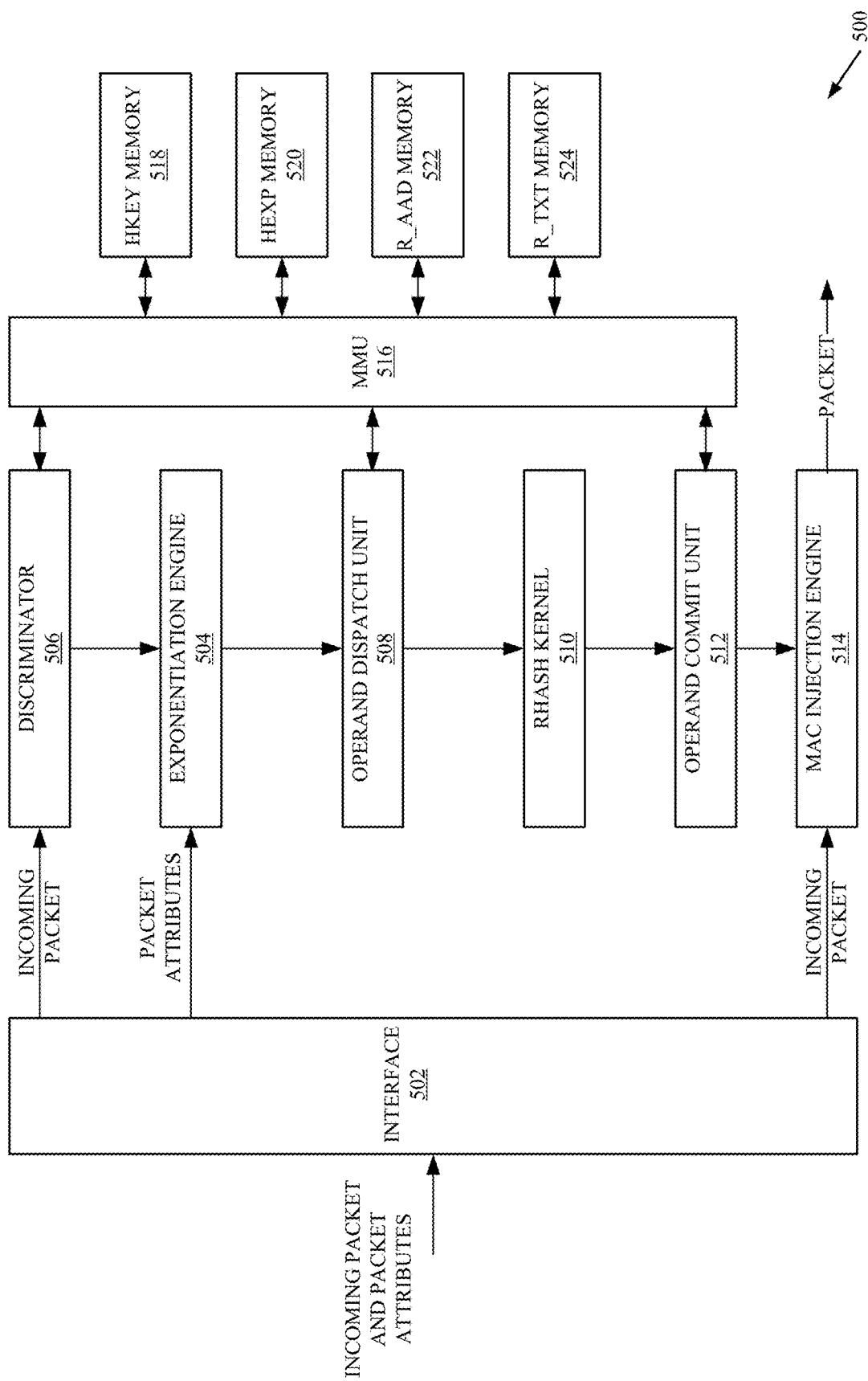
FIGS. 5A-5C show examples of an authentication architecture in accordance with one aspect of the embodiments.

An example of the authentication architecture 500 is illustrated as a block diagram in FIG. 5A, wherein the authentication architecture 500 may be used to perform AES-GCM Authentication. It is appreciated that the embodiments as described in FIG. 5A process data, e.g., bit of the block whether encrypted or not, as received without having to wait to complete the entire block as it is done in the conventional system. The AES-GCM Authentication architecture includes an input interface 502 coupled to an exponentiation engine 504, a discriminator 506 and a MAC injection unit 514. The discriminator 506 is coupled to the exponentiation engine 504, which, in turn, is coupled to an operand dispatch unit 508. The operand dispatch unit 508 maintains an RHASH Kernel 510 and communicates with a MMU 516. An operand commit unit 512 maintains a connection to the RHASH Kernel 510, to the memory management unit 516 and to the MAC injection unit 514. The memory managed by the MMU 516 includes a hash key ("HKey") memory 518, a hash key exponent ("HExp") memory 520, an R_AAD memory 522, and an R_TXT memory 524. It is appreciated that R_AAD memory 522 and R_TXT memory 524 maintain the intermediate hash value that is calculated at each cycle for the respective AAD and TXT respectively. It is appreciated that illustration of different memory components separately is for illustration purposes only and should not be construed as limiting the scope of the embodiments. For examples, the memories may be within different segments of a single memory unit.

In some embodiments, the discriminator 506 processes the incoming data and rearranges (segregates) the incoming data into complete blocks and partial blocks. The discriminator 506 also maps the incoming data among a plurality of main lanes 602 and a plurality of unity lanes 607 (see FIG. 6) in the RHASH Kernel 510 to establish that data for the same channel resides in adjacent lanes. For example, if the incoming data includes {1a(AAD, TXT), 1b(AAD, TXT), 2(AAD, TXT)}, the discriminator 506 may rearrange the incoming data into the following, {1a(AAD), 1b(AAD), 1a(TXT), 1b(TXT), 2(AAD,TXT)}. The discriminator 506 passes the rearranged data to the operand dispatch unit 508. In some embodiments, the discriminator 506 tracks the position of the received packets, i.e., where the packets are within a complete block or bit positions within a complete block. In one nonlimiting example, the discriminator 506 determines whether the received incoming packets or portions thereof complete a block, e.g., in a 128 bit block, the first 76 bits may have been received and then 52 bits are received subsequently which the discriminator 506 identifies as completing the block of 128 bits.

In some embodiments, the exponentiation engine 504 may retrieve the hash key from the Hkey memory 518 and raise it to an appropriate power (e.g., based on the number of AAD blocks and/or Text blocks that are received for the same packet and channel in a given cycle) for use in the GHASH Kernel 510. It is appreciated that multiple complete blocks may raise the hash key to a successively higher power to determine a new rolling hash value for that channel. Depending on the nature of the incoming packets, as defined by the packet attributes, the exponentiation engine 504 generates hash key powers for each channel present in a current cycle.

The raising of the hash key to successively higher powers may be based on a hardware task of obtaining repeated hashes for a series of blocks. Consider a nonlimiting example series of blocks, $A_0$, $A_1$, $A_2$, $A_3$. The task of obtaining repeated hashes for the example series of blocks may be represented mathematically as, GHASH=HASH ($A_3$+HASH ($A_2$+HASH($A_1$+HASH($A_0$)))). The function, HASH, may be represented as a binary multiplication by a hash key, H, that is, HASH(X)=H·X. Accordingly, the repeated hashes may be GHASH=$H^4A_0$+$H^3A_1$+$H^2A_2$+$HA_3$. The repeated hashes may be implemented in hardware, e.g., the exponentiation engine 504, for raising the hash key to an appropriate power for use in the GHASH Kernel 510.

In some embodiments, the operand dispatch unit 508 fetches commands from memory and rearranges the data into the GHASH Kernel 510 for processing. The operands are fetched by the operand dispatch unit 508 when the operand dispatch unit 508 senses from the discriminator 506 and from the present metadata that data for a particular channel has transmitted and is about to be received by the operand dispatch unit 508 for processing. The operand commit unit 512 returns the data and operands to the appropriate memory via the MMU 516. It is appreciated that the generated MAC may be output along with the incoming packet from the MAC injection engine 514.

Figure 5B:
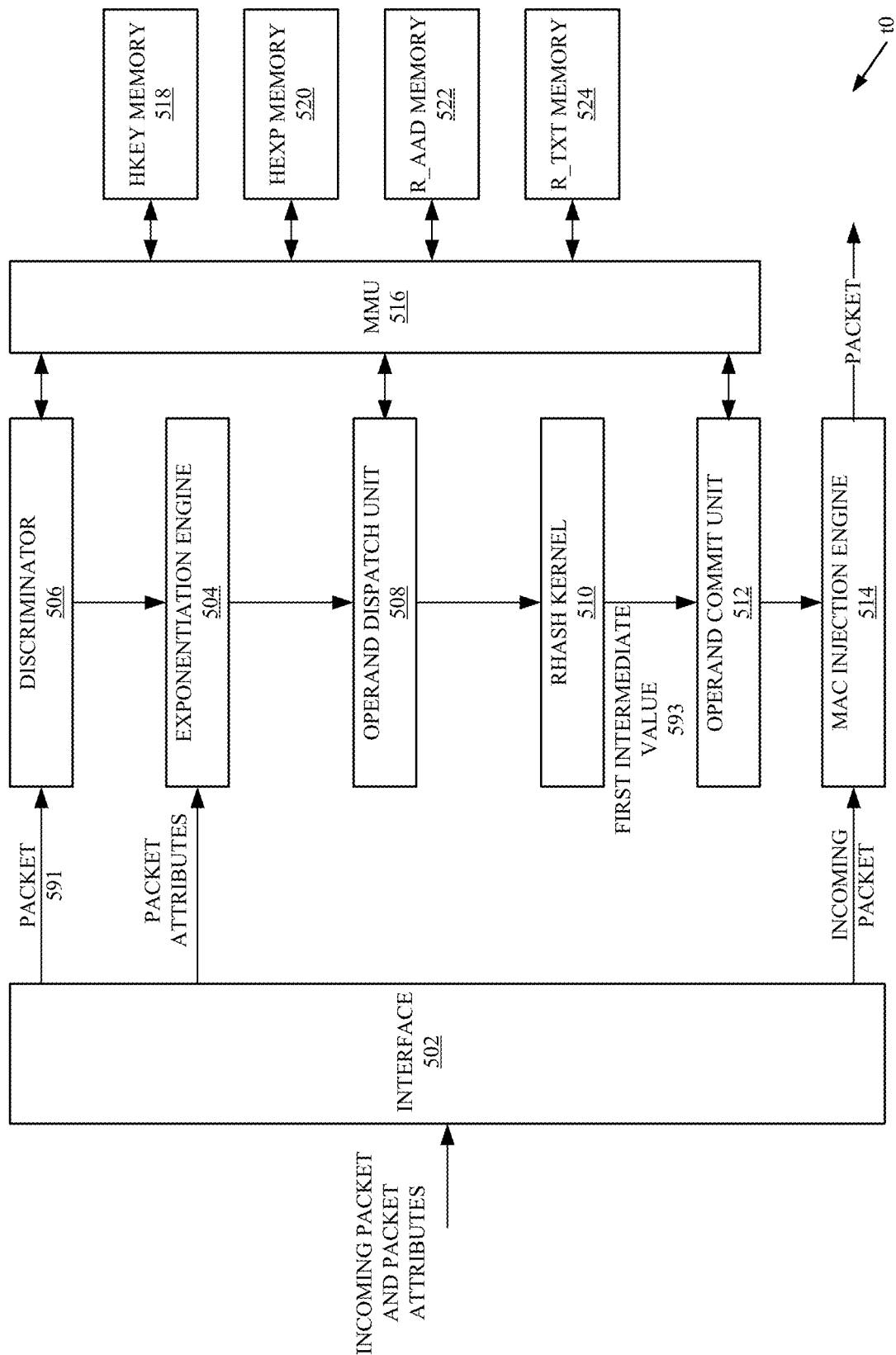

Referring now to FIG. 5B, a nonlimiting example of processing the incoming data to generate an intermediatory value for the authentication is described. In this example, at time to incoming packet, e.g., packet 591 which may be 76 bits is received by the discriminator 506. The discriminator 506 unit determines that the received 76 bits do not complete a block, e.g., block may be 128 bits, since no other bits have been received prior to time $t_0$, as an example. The exponentiation engine 504 generates hash keys for a complete block and since no complete block is received yet no hash key is generated. The operand dispatch unit 508 receives the packet 591 (in this example 76 bits) and since no hash key is generated because the block is incomplete then the operand dispatch unit 508 does not hash the received bits or dispatch the hash key to the kernel 510. In other words, the received 76 bits are sent to the RHASH kernel 510 and since this is the first packet and there are no intermediate hash value, then the received 76 bits are XORed with zeros in this example. It is appreciated that the XOR operation is provided for illustrative purposes and should not be construed as limiting the scope of the embodiments and that other logical operations may be used. As such, the first intermediate value 593 is generated and sent to the operand commit unit 512 for being committed and stored in the appropriate memory location, e.g., R_TXT memory 524 if the packets are text packet data.

Figure 5C:
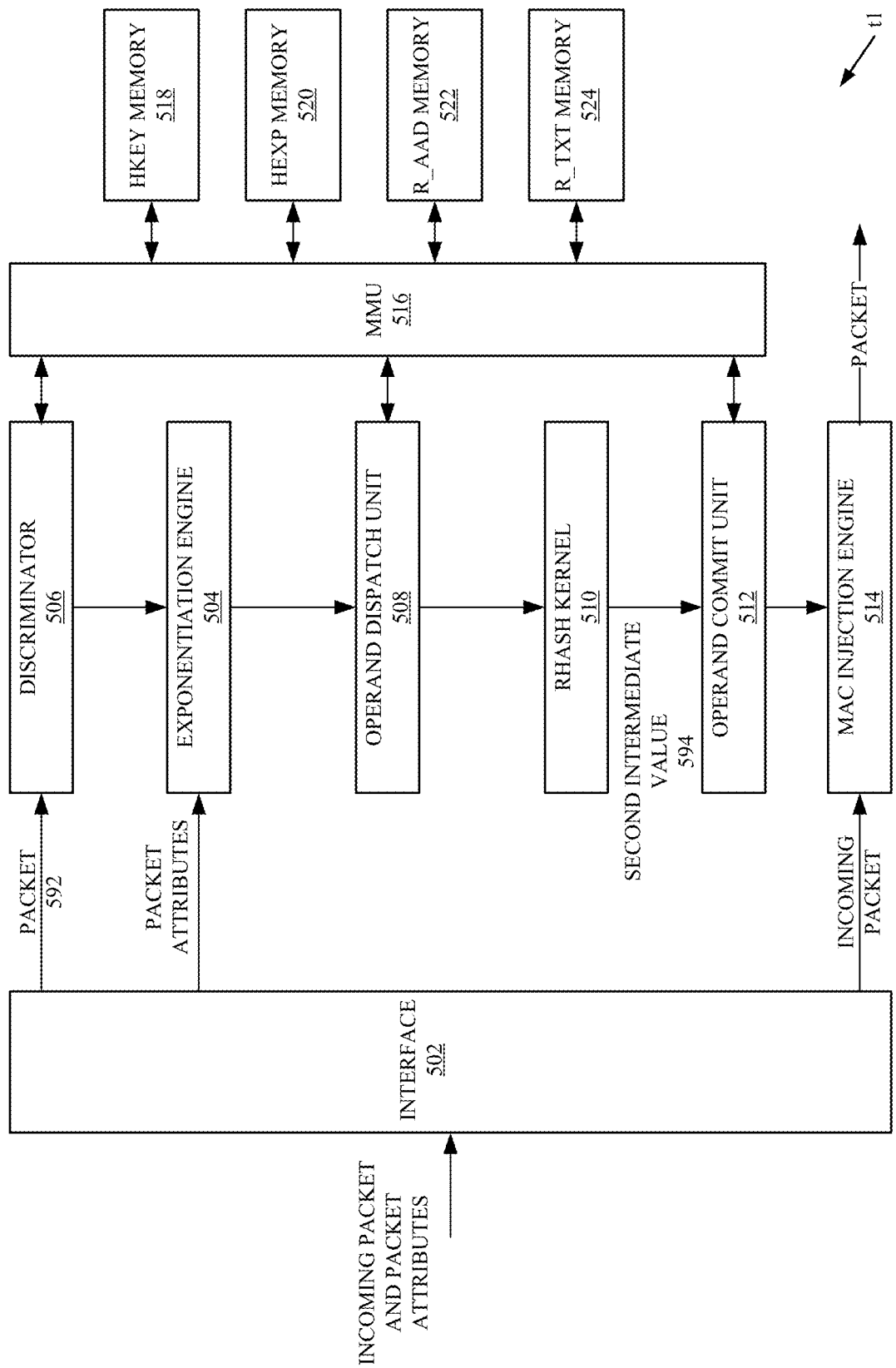

Referring now to FIG. 5C, a nonlimiting example of processing the incoming data to generate another intermediatory value for the authentication is described. At time $t_1$, subsequent to time $t_0$, another set of packets 592 are received. Packets 592 may include 128 bits. The discriminator 506 unit processes the packet 592 and determines that 52 bits out of the 128 received bits complete a block with already received 76 bit at time $t_0$. The discriminator 506 aligns the 52 bits as the last 52 bits of the block that completes the first 76 bits that were received at time $t_0$. The exponentiation engine 504 generates a hash key for the completed block and the generated hash key and the aligned 52 bits from the discriminator 506 are sent to the operand dispatch unit 508. The operand dispatch unit 508 fetches the first intermediary value 593 from the R_TXT memory 524 via the MMU 516 unit. The RHASH kernel 510 uses the hash key generated by the exponentiation engine 504 to hash the last 52 bits and the first intermediary value 593, as they are received by the operand dispatch unit 508. The RHASH kernel 510 generates a second intermediate value 594 that are sent to the operand commit unit 512 to be committed and stored in its respective memory component, as described above. It is appreciated that in some embodiments, the remaining bits of packet 592, i.e., 128 bits minus the 52 bits, may be added onto the second intermediate value 594 otherwise the first and the second intermediate values 593 and 594 may need to be stored and later reduced at the end of the last block. Accordingly, at each cycle an intermediate value is generated until the last block upon which the final intermediate value that is created becomes the authentication value that is output by the MAC injection engine 514.

The embodiments, as described process the bits as they are received for authentication purposes to generate an intermediary authentication value without having to wait to receive the entire bits. In other words, partial blocks can be processed without a need to wait to form a complete block, thereby reducing latency.

Figure 6:
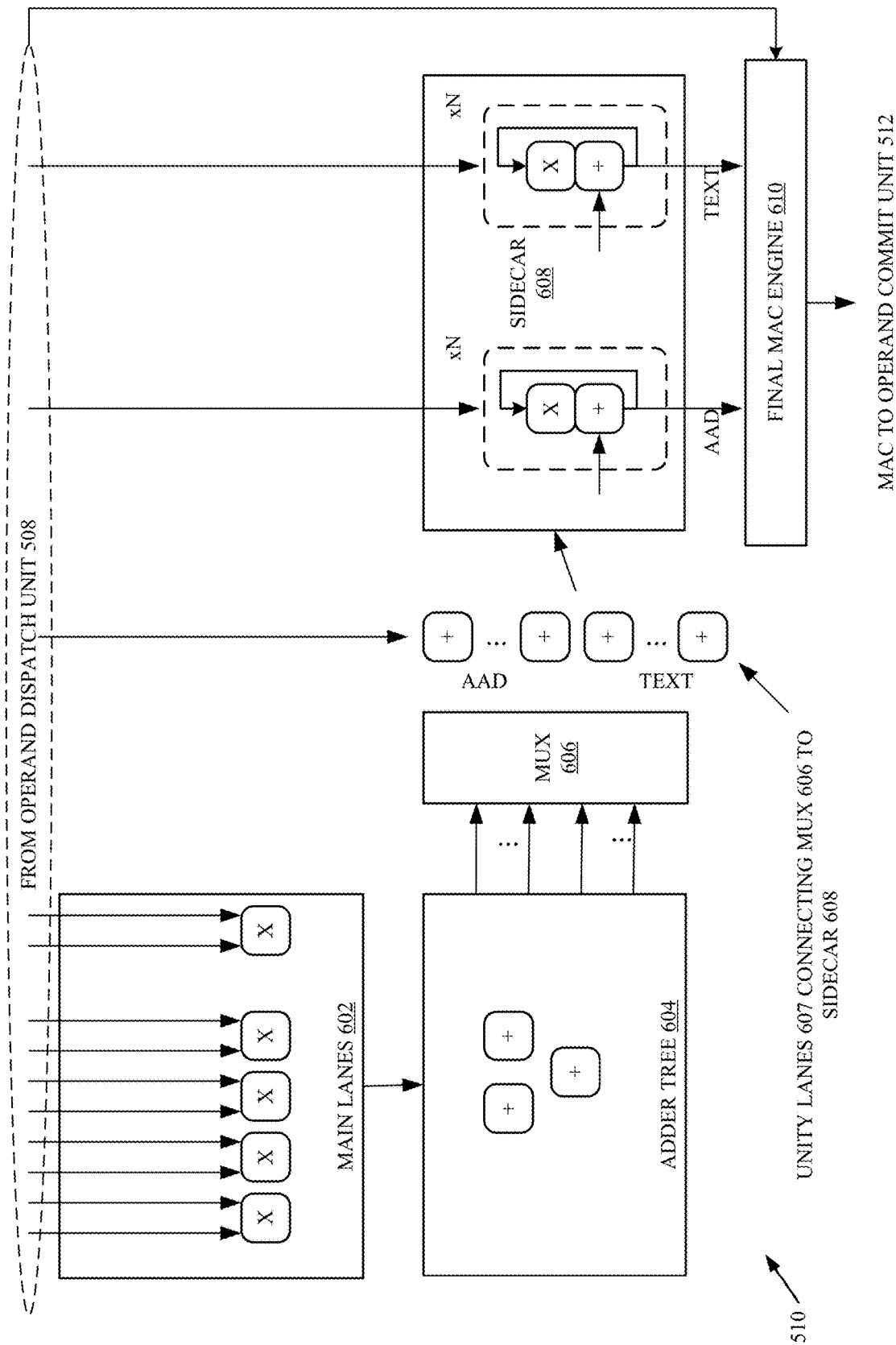
FIG. 6 shows an example of a RHASH Kernel of FIG. 5 in accordance with one aspect of the embodiments.

Referring now to the example of FIG. 6, an embodiment associated with the GHASH Kernel 510 according to some embodiments is shown. The GHASH Kernel 510 may be optimized and pipelined for high-speed operation.

As illustrated in FIG. 6, the GHASH Kernel 510 includes a set of main lanes 602 that are configured to access complete blocks and ending partial blocks of channel-adjacent AAD and Text data, and a set of unity lanes 607 containing unity operands (elements of a partial block which is not yet completed) present in the current cycle. The GHASH Kernel 510 further includes an adder tree 604 that receives incoming data as the output of the set of main lanes 602. A MUX 606 may be used to multiplex the output of the adder tree 604 into the unity lanes 607, where the output of the adder tree 604 is added to any unity operand 607 present for the channel that cycle. In one embodiment, the multiplexer 606 interposes the adder tree 604 and a plurality of adders (XOR gates) associated with the unity lanes 607. The GHASH Kernel 510 also includes a main rolling hash accumulator 608 (called a "sidecar" herein). The unity lanes 607 are fed into the sidecar 608. The sidecar 608 may include a feedback loop (one is shown for illustrative purposes but any number of feedback loops may be used). The feedback loop may be used to multiply a previous hash product by the hash key raised to a new power as determined based on the number of new complete blocks received for the given channel, thereby enabling newly resolved hash value to be added to a previous rolling hash value for each channel in the current cycle. The output of the sidecar 608 is received at a final MAC engine 610. The unity lanes 607 feed into and the sidecar 608. The Sidecar 608 uses the input values (e.g., hash values) to perform the accumulation, i.e., rolling hash accumulation. In other words, the AAD and TXT from R_AAD and R_TXT memories 522 and 524 respectively are collected in the current cycle and the new hash value is determined and added for that cycle by feeding it into the sidecar 608 to generate the new hash value. In other words, the intermediate hash values are accumulated and the new hash value is generated.

In operation, once incoming data has been subdivided by the discriminator 506 into AAD and CT for each packet present in a given cycle, individual blocks may be multiplied, at the set of main lanes 602, by the hash key raised to an appropriate power, e.g., using exponentiation engine 504. The resulting blocks are collected for each packet and combined in the adder tree 604 before being added to the unity operand and being accumulated in a tight RHASH multiplication loop in the sidecar 608.

The sidecar 608 of the RHASH Kernel 510 maintains an intermediate rolling has value of all AAD blocks and CT blocks for all channels. The RHASH Kernel 510 within the proposed authentication architecture 500 includes multiplexing (at the multiplexer 606) a single GMULT (at the sidecar 608) and an XOR gate (at the final MAC engine 610) supporting very high frequency operation. It is appreciated that in some nonlimiting embodiment, a mux may be used as an output from the feedback loop to input of the feedback loop in the sidecar 608 for illustration purposes, which should not be construed as limiting the scope of the embodiments. For example, a general purpose GPU may be used instead of the mux to multiplex the output of the feedback loop into the input of the feedback loop.

The embodiments use of an intermediate rolling hash result support an accumulated hash of both complete blocks and partial blocks. The intermediate rolling hash result may be calculated and stored separately for the AAD blocks and for the CT blocks contained in each packet present in a given cycle. In an application requiring processing of up to eight packets (and aggregates) per cycle, for example, eight sets of CT processing logics and eight sets of AAD processing logics may be instantiated to support concurrent calculation of all intermediate rolling hash results.

It is appreciated that in order to reduce the number of GMULTs in the feedback loop in the sidecar 608, the incoming blocks may be pre-multiplied, at the main lanes 602, by the hash key raised to the appropriate power (by the exponentiation engine 504). As such, for the GHASH calculation initially multiplied products are created. These initially multiplied products may then be summed in the adder tree 604 before the adder tree 604 sends the sums toward the sidecar 608.

It is appreciated that using the discriminator 506 adapted to rearrange, into adjacent lanes, packets present in the same cycle for the same channel may eliminate crossbar requirements from the critical path in the sidecar 608. Additionally, to eliminate any crossbar logic in the GHASH Kernel 510 and to support full rate processing with valid data every cycle, the multiplexer 606 may steer packets for the same channel to the same feedback lane in the sidecar 608 for accumulation.

In some embodiments, the set of main lanes 602, of the GHASH Kernel 510, are configured to access, via the operand dispatch unit 508, complete blocks and ending partial blocks of channel-adjacent AAD and Text data. The set of main lanes 602 multiplies the received blocks by the hash key raised to an appropriate power. The hash key raised to the appropriate power may be determined by the exponentiation engine 504 and received, by the set of main lanes 602, from the operand dispatch unit 508.

In some embodiments, the adder tree 604 creates an initial hash value for the incoming data, separately for AAD and Text data, per channel on the current cycle. The initial hash values from the adder tree 604 are multiplexed, by a multiplexer 606, into unity lanes 607. The multiplexing of the initial hash values from the adder tree 604 may reduce multiplexing within the feedback loop within the sidecar 608. The multiplexer 606 may carry out the multiplexing by first examining channel attributes for adjacent cycles and then outputting initial hash values associated with the same channel to the same unity lane. The set of unity lanes facilitates the accumulation unity (partial, non-ending) AAD and Text operands from the operand dispatch unit 508 into the value multiplexed from the adder tree 604 by the multiplexer 606 into the intermediate rolling hash result that is generated at the sidecar 608. The sidecar 608 performs an accumulation of the incoming initial hash value per channel into a current intermediate rolling hash value calculated from previous cycles.

In some embodiments, the final MAC engine 610 receives output from the sidecar 608. The final MAC engine 610 calculates a final MAC by merging an AAD rolling hash result and a CT rolling hash result into a merged result after multiplying the AAD rolling hash result by the hash key raised to an appropriate power. This hash key power is determined by the number of text blocks that are included in the AU. The final MAC engine 610 signs the merged result with the length and subsequently XORed with the EKY0 value.

Figure 7:
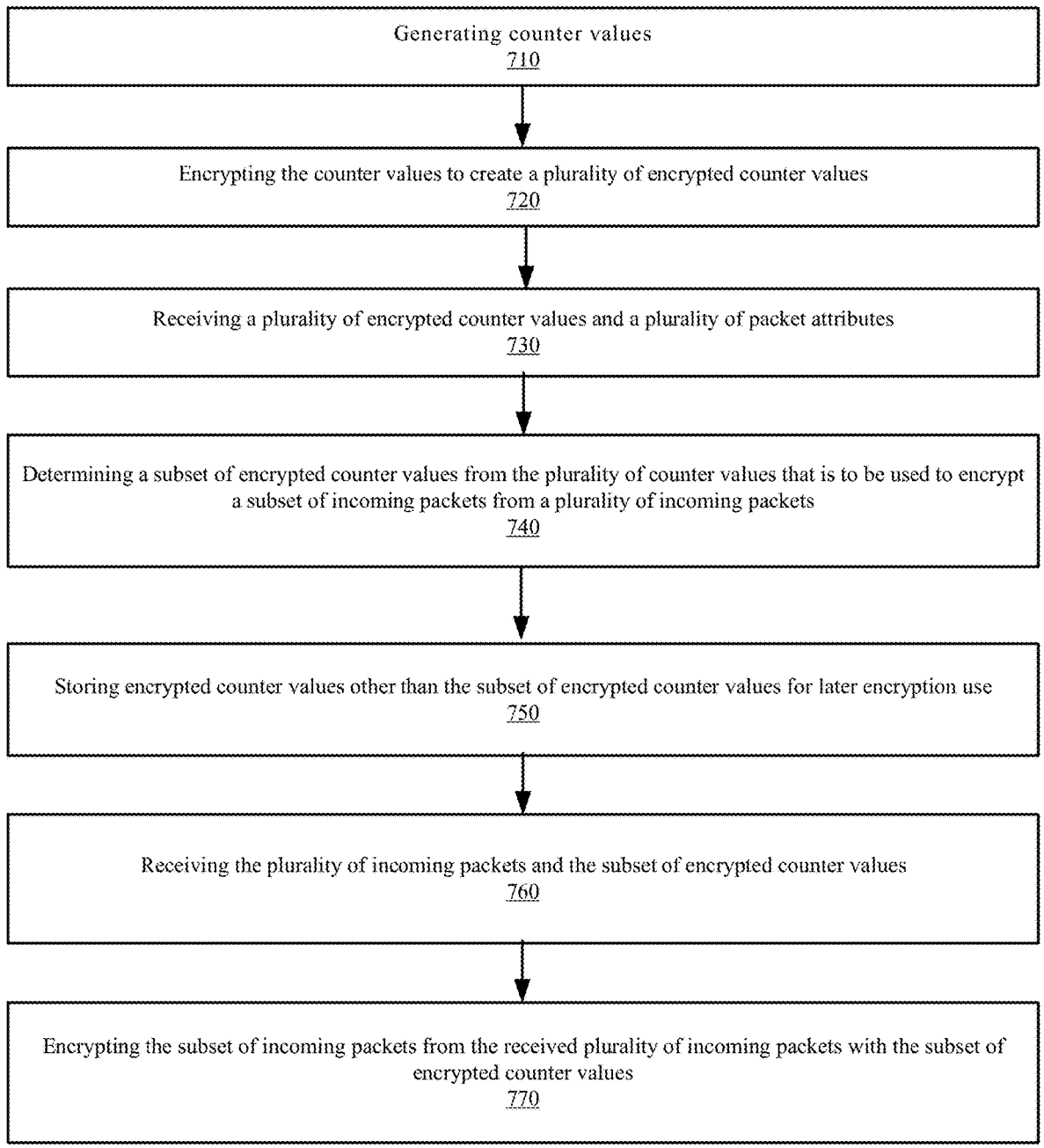
FIG. 7 shows an example of a flow diagram to align encrypted counter values with unaligned incoming data packets for encryption in accordance with one aspect of the embodiments.

Referring now to FIG. 7, a flow diagram to align encrypted counter values with unaligned incoming packets is shown according to one aspect of the embodiments. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

At step 710, a plurality of counter values may be generated, as described above with respect to FIGS. 2-4, e.g., by using a vector data, counters to increment, and/or concatenation unit. At step 720, the plurality of counter values is encrypted, e.g., according to AES processing as an example, as described above in FIGS. 2-4. At step 730, a plurality of encrypted counter values and a plurality of packet attributes are received, as described above. At step 740, a subset of encrypted counter values from the plurality of counter values that is to be used to encrypt a subset of incoming packets from a plurality of incoming packets is determined. At step 750, encrypted counter values other than the subset of encrypted counter values are stored for later encryption use. At step 760, the plurality of incoming packets and the subset of encrypted counter values are received and the subset of incoming packet are encrypted with the subset of encrypted counter values, at step 770, as described above.

It is appreciated that the plurality of encrypted counter values may be received at a first cycle and wherein the plurality of encrypted counter values is stored in a memory component at the first cycle, as described above. According to some embodiments, at a second cycle that occurs after the first cycle, the stored plurality of encrypted counter values are fetched from the memory component, and the determination of the subset of encrypted counter values that is to be used to encrypt the subset of incoming packets occurs at the second cycle. In some embodiments, at a third cycle that occurs after the second cycle, the encrypted counter values other than the subset of subset of encrypted counter values that were stored are fetched. It is appreciated that at the third cycle, additional plurality of encrypted counter values may be received and stored in the memory component.

It is appreciated that the incoming packets may be unaligned, however, the proposed embodiments above, aligns the encrypted counter values to the incoming packets.

It should be appreciated that one or more steps of the embodiment methods provided herein may be performed by corresponding units or modules. For example, data may be transmitted by a transmitting unit or a transmitting module. Data may be received by a receiving unit or a receiving module. Data may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A cryptographic system comprising:
a block transfer engine configured to
receive a plurality of encrypted counter values and a plurality of packet attributes;
determine a subset of encrypted counter values from the plurality of counter values that is to be used to encrypt a subset of incoming packets from a plurality of incoming packets;
store encrypted counter values other than the subset of encrypted counter values for later encryption use; and
a crypto map unit configured to
receive the plurality of incoming packets and the subset of encrypted counter values from the block transfer engine;
encrypt the subset of incoming packets from the received plurality of incoming packets with the subset of encrypted counter values.

2. The cryptographic system of claim 1, wherein the plurality of encrypted counter values is received by the block transfer engine at a first cycle and wherein the plurality of encrypted counter values is stored by the block transfer engine in a memory component at the first cycle.

3. The cryptographic system of claim 2, wherein at a second cycle that occurs after the first cycle, the block transfer engine is configured to fetch the stored plurality of encrypted counter values from the memory component, and wherein the determination of the subset of encrypted counter values that is to be used to encrypt the subset of incoming packets occurs at the second cycle.

4. The cryptographic system of claim 3, wherein at a third cycle that occurs after the second cycle, the block transfer engine is configured to fetch the encrypted counter values other than the subset of subset of encrypted counter values that were stored.

5. The cryptographic system of claim 4, wherein at the third cycle, the block transfer engine is configured to receive additional plurality of encrypted counter values and stores the additional plurality of encrypted counter values in the memory component.

6. The cryptographic system of claim 1 further comprising a counter generation unit configured to generate a plurality of counter values.

7. The cryptographic system of claim 6, wherein the counter generation unit is configured to generate counter values based on a vector data that is subsequently incremented.

8. The cryptographic system of claim 1 further comprising an encryption engine configured to encrypt a plurality of counter values to generate the plurality of encrypted counter values.

9. The cryptographic system of claim 8, wherein the encryption engine is configured to use Advanced Encryption Standard (AES) processing.

10. The cryptographic system of claim 1, wherein the block transfer engine is configured to align the plurality of encrypted counter values to packets of the incoming plurality of packets.

11. The cryptographic system of claim 1, wherein packets in the incoming plurality of packets are unaligned.

12. A method comprising:
receiving a plurality of encrypted counter values and a plurality of packet attributes;
determining a subset of encrypted counter values from the plurality of counter values that is to be used to encrypt a subset of incoming packets from a plurality of incoming packets;
storing encrypted counter values other than the subset of encrypted counter values for later encryption use;
receiving the plurality of incoming packets and the subset of encrypted counter values; and
encrypting the subset of incoming packets from the received plurality of incoming packets with the subset of encrypted counter values.

13. The method of claim 12, further comprising receiving the plurality of encrypted counter values at a first cycle and storing the plurality of encrypted counter values in a memory component at the first cycle.

14. The method of claim 13, further comprising at a second cycle that occurs after the first cycle, fetching the stored plurality of encrypted counter values from the memory component, and wherein the determination of the subset of encrypted counter values that is to be used to encrypt the subset of incoming packets occurs at the second cycle.

15. The method of claim 14, further comprising at a third cycle that occurs after the second cycle, fetching the encrypted counter values other than the subset of subset of encrypted counter values that were stored.

16. The method of claim 15, further comprising at the third cycle, receiving additional plurality of encrypted counter values and storing the additional plurality of encrypted counter values in the memory component.

17. The method of claim 12 further comprising generating a plurality of counter values.

18. The method of claim 17 further comprising generating counter values based on a vector data that is subsequently incremented.

19. The method of claim 12 further comprising encrypting a plurality of counter values to generate the plurality of encrypted counter values.

20. The method of claim 19, further comprising using Advanced Encryption Standard (AES) processing for encryption.

21. The method of claim 12 further comprising aligning the plurality of encrypted values to packets of the incoming plurality of packets.

22. The method of claim 21, wherein packets in the incoming plurality of packets are unaligned.

23. A cryptographic system comprising:
a means for receiving a plurality of encrypted counter values and a plurality of packet attributes;
a means for determining a subset of encrypted counter values from the plurality of counter values that is to be used to encrypt a subset of incoming packets from a plurality of incoming packets;
a means for storing encrypted counter values other than the subset of encrypted counter values for later encryption use;
a means for receiving the plurality of incoming packets and the subset of encrypted counter values; and
a means for encrypting the subset of incoming packets from the received plurality of incoming packets with the subset of encrypted counter values.

24. The cryptographic system of claim 23 further comprising a means for receiving the plurality of encrypted counter values at a first cycle and storing the plurality of encrypted counter values in a memory component at the first cycle.

25. The cryptographic system of claim 24 further comprising a means for fetching the stored plurality of encrypted counter values from the memory component at a second cycle that occurs after the first cycle, and wherein the determination of the subset of encrypted counter values that is to be used to encrypt the subset of incoming packets occurs at the second cycle.

26. The cryptographic system of claim 25 further comprising a means for fetching the encrypted counter values other than the subset of subset of encrypted counter values that were stored at a third cycle that occurs after the second cycle.

27. The cryptographic system of claim 26 further comprising a means for receiving additional plurality of encrypted counter values at the third cycle and a means for storing the additional plurality of encrypted counter values in the memory component at the third cycle.

28. The cryptographic system of claim 23 further comprising a means for generating a plurality of counter values.

29. The cryptographic system of claim 28 further comprising a means for generating counter values based on a vector data that is subsequently incremented.

30. The cryptographic system of claim 23 further comprising a means for encrypting a plurality of counter values to generate the plurality of encrypted counter values.

31. The cryptographic system of claim 30, wherein the encryption uses Advanced Encryption Standard (AES) processing for encryption.

32. The cryptographic system of claim 23 further comprising a means for aligning the plurality of encrypted values to packets of the incoming plurality of packets.

33. The cryptographic system of claim 23, wherein packets in the incoming plurality of packets are unaligned.

34. A method comprising:
receiving a first plurality of packets;
determining whether a first subset of the first plurality of packets completes a block of data, wherein the first subset and a second subset form the first plurality of packets;
in response to determining that the block of data is complete, hashing the first subset with a first hash key to generate a first intermediary hash value;
receiving a second plurality of packets;
determining whether a first subset of the second plurality of packets completes another block of data, wherein the first subset and a second subset form the second plurality of packets;
in response to determining that the another block of data is complete, hashing the first subset of the second plurality of packets with a second hash key to generate a second intermediary hash value; and generating a third intermediary hash value based on the first and the second intermediary hash values.

35. The method of claim 34, wherein the third intermediary hash value is the message authentication code (MAC) if the another block of data is the last block of data.

36. The method of claim 34 further comprising performing a logical operation on the subset of the first plurality of packets if the subset does not complete the block of data to generate a first intermediary value.

37. The method of claim 36, wherein the logical operation is an XOR operation on the subset of the first plurality of packets and zeros.

38. The method of claim 34, wherein the first hash key and the second hash key are the same.

* * * * *